United States Patent [19]

Terrell

[11] 3,896,177
[45] July 22, 1975

[54] 1-CHLORO-1-HYDROPERFLUOROPROPYL DIFLUOROMETHYL ETHER
[75] Inventor: Ross C. Terrell, Plainfield, N.J.
[73] Assignee: Airco, Inc., Montvale, N.J.
[22] Filed: Aug. 10, 1973
[21] Appl. No.: 387,563
    Related U.S. Application Data
[62] Division of Ser. No. 187,582, Oct. 7, 1971, Pat. No. 3,784,706.

[52] U.S. Cl............................................. 260/614 F
[51] Int. Cl............................................. C07c 43/00
[58] Field of Search................................. 260/614 F

[56]         References Cited
          UNITED STATES PATENTS
3,689,459   9/1972   Regan............................. 260/614 F OTHER PUBLICATIONS
Terrell et al., J. Med. Chem., (1971) 14, No. 6, 517–519.
Larsen, Fluorine Chemistry Reviews, Vol. 3, (1969), 38–39.

Primary Examiner—Howard T. Mars
Attorney, Agent, or Firm—Roger M. Rathbun; Edmund W. Bopp; H. Hume Mathews

[57]            ABSTRACT 1-chloro-1-hydroperfluoropropyl difluoromethyl ether of the formula $$CF_3-CF_2-CHCl-O-CHF_2$$

is useful as an inhalation anesthetic.

1 Claim, No Drawings

1-CHLORO-1-HYDROPERFLUOROPROPYL DIFLUOROMETHYL ETHER

This is a Division of application Ser. No. 187,582, filed Oct. 7, 1971 now U.S. Pat. No. 3,784,706.

This invention relates to 1-chloro-1-hydroperfluoropropyl difluoromethyl ether and its use in producing anesthesia in anesthetic-susceptible mammals. The chemical formula for this ether is $$CF_3-CF_2-CHCl-O-CHF_2$$

The compound of the present invention lends itself to effective use as an inhalant anesthetic in respirable mixtures containing life-supporting concentrations of oxygen, with or without other inhalation anesthetics, such as nitrous oxide. Administration of the compound may be by any of the well known techniques for administering general inhalation anesthetics, for example, by using the open drop or semi-closed systems.

The effective amount of the compound of this invention to be employed depends on the level of anesthesia to which the mammal is to be brought, the rate at which anesthesia is to be induced, and the length of time over which anesthesia is to be maintained. Minor volume percentages of the compound in oxygen can often be employed. The amount used should be sufficient to provide a significant anesthetic effect but not so much as to produce unacceptable deleterious side effects. For instance, about 0.5 to 3 volume percent of the compound may often be used. The amount of anesthesia to be used can be regulated, starting with a small amount of the ether and gradually increasing the amount until the desired plane of anesthesia is reached. By then monitoring the physical reactions of the mammal, as is the usual procedure, the duration and plane of anesthesia can be readily controlled.

The ether compound of this invention is also easily miscible with other organic liquids, including fats and oils, and has useful solvent properties, for example, as a solvent for fluorinated olefins and other fluorinated materials, such as fluoro waxes. The compound of this invention may be used to prepare pastes and dispersions of such materials useful for coatings and the like, and may be used as a degreasing agent. In the latter capacity, for example, the ether compound of this invention can be used as a solvent to remove grease from a metal surface that is to be painted.

As an example of a specific synthesis of the compound of this invention, 215 g. of dimethyl sulfate was added to a solution of commercially available $CF_3CF_2CH_2OH$ (200 g.) and KOH (112 g.) in water (150 cc.) while maintaining the temperature below 50°C. The product $CF_3CF_2CH_2OCH_3$ was distilled directly from the reaction mixture, b.p. 46–48°C.

The 1,1-dihydroperfluoropropyl methyl ether obtained (465 g., 2.84 moles) was chlorinated in a glass reactor using chlorine gas in the presence of incandescent light until a total of 9.37 moles of chlorine (3.3 moles per mole of the ether) had reacted.

The mixture of chlorinated products (756 g.) was fractionally distilled to give a trichloroether fraction (300 g.) having a boiling range of 51°–56°C. at 150 mm. Hg. pressure. This fraction contained approximately equal parts of $CCl_3OCH_2CF_2CF_3$ and $CHCl_2OCHClCF_2CF_3$. There was also obtained a tetrachloroether fraction, b.p. 77°C. at 100 mm. Hg., consisting mostly of $CCl_3OCHClCF_2CF_3$.

The mixed trichloroether fraction described above was fluorinated in a stainless steel flask using 5 percent by weight of $SbCl_5$ as catalyst and two moles of anhydrous HF per mole of ether as the fluorinating agent. The reaction was conducted at 0°C. The crude reaction product was washed with water and $CHF_2OCHClCF_2CF_3$ was isolated therefrom by fractional distillation and preparative gas chromatography.

Calculated for $C_4H_2ClF_7O$: C,20.47; H,0.86 Found: C, 20.45; H, 0.75

This normally liquid compound has a boiling point of 66°C., a specific gravity of 1.52, a vapor pressure at 25°C. of 170 mm. Hg. and a not unpleasant odor. It is nonflammable.

In order to determine the potency of the ether of the present invention as an inhalation anesthetic in combination with oxygen, tests were carried out on mice. The compound tested was at least 99.5 percent pure as determined by vapor phase chromatography. In the tests, the ether compound is administered to test mice by a standard procedure in which a measured quantity of the agent is placed in a laboratory jar and allowed to completely vaporize so as to give a calculated vapor concentration. The test mice are then quickly placed in the jar and observed. Anesthesia is determined by observing the righting reflex of the mice. Recovery time is measured beginning when the mice are transferred from the test jar to room air and ending when the mice are observed to be able to walk.

In such tests the 1-chloro-1-hydroperfluoropropyl difluoromethyl ether induced a very light anesthesia in one minute 55 seconds when employed at a vapor concentration of 1 percent; recovery required 30 seconds. The induction was stormy.

At 1.5 percent vapor concentration there was a brief excitement phase in some of the mice during induction, which required 1 minute 16 seconds. The mice were flaccid in maintenance and their respiration slowed to 30 to 60 per minute.

At 2.5 percent vapor concentration the respiration was depressed to 6 per minute. Induction required 55 seconds, recovery 3 minutes 17 seconds. There was brief apnea and cyanosis in recovery, but the mice soon became very active.

While there has been described what are at present considered to be preferred embodiments of the invention, it will be understood that various modifications may be made therein which are within the true spirit and scope of the invention.

I claim:

1. 1-chloro-1-hydroperfluoropropyl difluoromethyl ether of the formula $$CF_3-CF_2-CHCl-O-CHF_2.$$

* * * * *